(12) United States Patent
Baker

(10) Patent No.: US 7,593,360 B2
(45) Date of Patent: Sep. 22, 2009

(54) METHOD AND APPARATUS FOR USE IN A COMMUNICATION SYSTEM

(75) Inventor: Kenneth R. Baker, Boulder, CO (US)

(73) Assignee: QUALCOMM Incorporated, San Diego, CA (US)

(*) Notice: Subject to any disclaimer, the term of this patent is extended or adjusted under 35 U.S.C. 154(b) by 985 days.

(21) Appl. No.: 10/844,666

(22) Filed: May 12, 2004

(65) Prior Publication Data

US 2004/0233874 A1 Nov. 25, 2004

Related U.S. Application Data

(60) Provisional application No. 60/469,975, filed on May 12, 2003.

(51) Int. Cl.
*H04B 7/216* (2006.01)
*H04L 12/26* (2006.01)

(52) U.S. Cl. ............... 370/315; 370/328; 370/252

(58) Field of Classification Search ......... 370/246, 370/315, 328, 342, 252
See application file for complete search history.

(56) References Cited

U.S. PATENT DOCUMENTS

| | | | |
|---|---|---|---|
| 5,289,390 A * | 2/1994 | Unverrich | 345/1.1 |
| 5,381,444 A | 1/1995 | Tajima | |
| 5,838,580 A | 11/1998 | Srivatsa | |
| 6,094,562 A | 7/2000 | Zhong | |
| 6,385,435 B1 | 5/2002 | Lee | |
| 6,507,741 B1 | 1/2003 | Bassirat | |
| 6,580,749 B1 * | 6/2003 | Miura | 375/147 |
| 7,006,461 B2 * | 2/2006 | Kilfoyle et al. | 370/315 |
| 7,039,418 B2 * | 5/2006 | Amerga et al. | 455/456.1 |
| 7,194,020 B1 * | 3/2007 | Farag et al. | 375/148 |
| 7,283,787 B2 * | 10/2007 | Diao et al. | 455/11.1 |
| 2002/0115448 A1 * | 8/2002 | Amerga et al. | 455/456 |
| 2003/0083816 A1 * | 5/2003 | Imakado et al. | 701/213 |

(Continued)

FOREIGN PATENT DOCUMENTS

EP 00674452 9/1995

(Continued)

OTHER PUBLICATIONS

European Search Report 04752206, European Search Authority The Hague, May 23, 2008.

(Continued)

*Primary Examiner*—Min Jung
(74) *Attorney, Agent, or Firm*—Jae-Hee Choi; Linda G. Gunderson

(57) ABSTRACT

Apparatus and methods are disclosed for determining a tolerable propagation delay between a repeater and a base station in a communication system. In one embodiment, a tolerable length of fiber optic cable between a repeater and a base station is determined. More particularly, a desired search window size in time is determined. A maximum fiber optic cable delay value is determined based on the desired search window size. Also, a ratio value of fiber optic cable delay value to fiber optic cable length is then determined. The tolerable length of the fiber optic cable is then determined based on the maximum fiber optic cable delay value and the ratio value.

45 Claims, 12 Drawing Sheets

U.S. PATENT DOCUMENTS

2003/0174690 A1     9/2003   Benveniste
2006/0062194 A1*   3/2006   Fiut et al. .................. 370/342
2006/0128399 A1*   6/2006   Duan et al. .............. 455/456.5

FOREIGN PATENT DOCUMENTS

WO      WO 02059638     8/2002

OTHER PUBLICATIONS

International Search Report PCT/US2004/015130, International Search Authority US, Apr. 4, 2006.
International Preliminary Report on Patentability PCT/US2004/015130, International Search Authority US, Aug. 3, 2006.
Written Opinion PCT/US2004/015130, International Search Authority US, May 2, 2006.

* cited by examiner

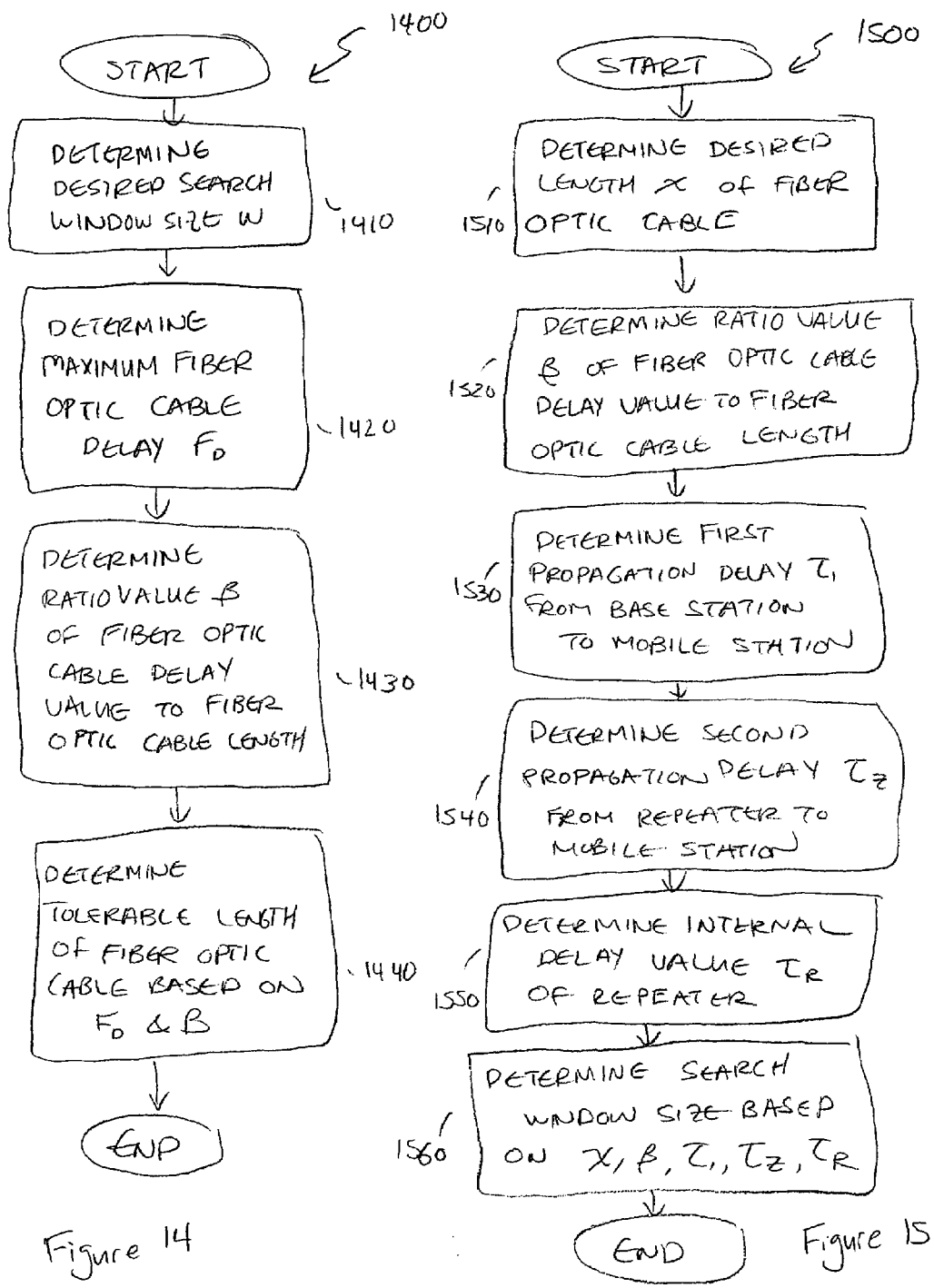

METHOD AND APPARATUS FOR USE IN A COMMUNICATION SYSTEM

CROSS-REFERENCE TO RELATED APPLICATIONS

The present Application for Patent claims priority to Provisional Application No. 60/469,975 entitled "Method and Apparatus for Use in a Communication System" filed May 12, 2003, and assigned to the assignee hereof and hereby expressly incorporated by reference herein.

BACKGROUND

I. Field of Invention

The invention generally relates to communication systems and more particularly to communication systems having one or more repeaters.

II. Description of the Related Art

In wireless communication systems, mobile stations or user terminals receive signals from fixed position base stations (also referred to as cell cites or cells) that support communication links or service within particular geographic regions adjacent to or surrounding the base stations. In order to aid in providing coverage, each cell is often sub-divided into multiple sectors, each corresponding to a smaller service area or geographic region. A network of base stations provides wireless communication service to an expansive coverage area. Due to various geographic and economic constraints, the network of base stations does not provide adequate communication services in some areas within the desired coverage area. These "gaps" or "holes" in the coverage area are filled with the use of repeaters.

Generally, a repeater is a high gain bi-directional amplifier. Repeaters receive, amplify and re-transmit signals to and from the communication device and a base station. The repeater may provide communication service to the coverage hole, which was previously not serviced by the base station. Repeaters may also augment the coverage area of a sector by shifting the location of the coverage area or altering the shape of the coverage area. Accordingly, repeaters can play an integral role in providing wireless communication. However, propagation delays between repeaters and base stations may cause synchronization problems in some communication systems.

SUMMARY

Embodiments disclosed herein address the above stated needs by providing a technique that determines tolerable delays in communication link between a repeater and a base station. In one aspect, a method for use in a communication system, wherein a remote station communicates to a base station through a repeater attached to the base station using a physical link, comprises determining a desired search window size in time; determining a maximum physical link delay value based on the desired search window size; determining a ratio value of physical link delay value to physical link length; and determining a tolerable length of the physical link based on the maximum physical link delay value and the ratio value. Determining the tolerable length of the physical link may comprise determining a maximum length of the physical link tolerated by the desired search window size. Determining the maximum physical link delay value may comprise determining a first propagation delay value from the base station to the remote station; determining a second propagation delay value from the repeater to the remote station; determining an internal delay value of the repeater; and determining the maximum physical link delay value based on the desired search window size, the internal delay value and the first and second propagation delay values. Determining the maximum length of the physical link may comprises subtracting the second propagation delay value and the internal delay value from the first propagation delay value to obtain a first sum value; adding half of the desired search window size with the first sum value to obtain a second sum value; and dividing the second sum value by the ratio value to determine the maximum length of the physical link.

In another aspect, a method for use in a communication system, wherein a remote station communicates to a base station through a repeater attached to the base station using a physical link, comprises determining a desired length of the physical link; determining a ratio value of physical link delay value to physical link length; determining a first propagation delay value from the base station to the remote station; determining a second propagation delay value from the repeater to the remote station; determining an internal delay value of the repeater; and determining a search window size based on the desired length of the physical link, the ratio value the internal delay value and the first and second propagation delay values. Determining the search window size may comprise multiplying the desired length of the physical link by the ratio value to obtain a physical link delay value; adding the second propagation delay value and the internal delay value with the physical link delay value to obtain a first sum value; subtracting the first propagation delay value from the first sum value to obtain a second sum value; and doubling the second sum value to determine the search window size.

In a further aspect, an apparatus for communication system, wherein a remote station communicates to a base station through a repeater attached to the base station using a physical link, comprises a summing unit configured to subtract a first propagation delay value and an internal delay value of the repeater from a second propagation delay value, and to add half of a desired search window size to obtain a sum value, wherein the first propagation delay value is a delay from the repeater to the remote station and the second propagation delay value is a delay from the base station to the remote station; and a first dividing unit configured to divide the sum value by a ratio value of physical link delay value to physical link length. The apparatus may further comprise a second dividing unit coupled to the summing unit and configured to divide the desired search window size to obtain half of the desired search window size.

In still a further aspect, an apparatus for communication system, wherein a remote station communicates to a base station through a repeater attached to the base station using a physical link, comprises a first multiplying unit configured to multiply a desired length of the physical link by a ratio value of physical link delay value to physical link length to obtain a product value; and a summing unit configured to add a first propagation delay value and an internal delay value of the repeater with the first product value, and to subtract a second propagation delay value to obtain a sum value, wherein the first propagation delay value is a delay from the repeater to the remote station and the second propagation delay value is a delay from the base station to the remote station. The apparatus may also comprise a second multiplying unit configured to double the sum value.

In still another aspect, a machine readable medium storing machine readable codes for communication system, wherein a remote station communicates to a base station through a repeater attached to the base station using a physical link, comprises machine readable codes for determining a desired search window size in time; machine readable codes for determining a maximum physical link delay value based on the desired search window size; machine readable codes for determining a ratio value of physical link delay value to physical link length; and machine readable codes for determining a tolerable length of the physical link based on the maximum physical link delay value and the ratio value.

In still a further aspect, a machine readable medium storing machine readable codes for communication system, wherein a remote station communicates to a base station through a repeater attached to the base station using a physical link, comprises machine readable codes for determining a desired length of the physical link; machine readable codes for determining a ratio value of physical link delay value to physical link length; machine readable codes for determining a first propagation delay value from the base station to the remote station; machine readable codes for determining a second propagation delay value from the repeater to the remote station; machine readable codes for determining an internal delay value of the repeater; and machine readable codes for determining a search window size based on the desired length of the physical link, the ratio value the internal delay value and the first and second propagation delay values.

In yet another aspect, a method for communication system, wherein a remote station communicates to a base station through a repeater attached to the base station using a physical link, comprises determining a desired search window size in time; determining a tolerable physical link delay value based on the desired search window size; determining a ratio value of physical link delay value to physical link length; determining a length of the physical link; and determining whether the length of the physical link is sufficient for the desired search window size, based on the tolerable physical link delay value and the ratio value.

In a further aspect, an apparatus for communication system, wherein a remote station communicates to a base station through a repeater attached to the base station using a physical link, comprises a storage medium configured to store a first propagation delay value from the base station to the remote station, a second propagation delay value from the repeater to the remote station, an internal delay value of the repeater and a desired search window size; and a processor coupled to the storage medium and configured to determine whether a length of the physical link is sufficient for the desired search window size, based on the first and second propagation delay values, the internal delay value and the desired search window size.

In the above embodiments, the physical link may comprise a fiber optic cable.

BRIEF DESCRIPTION OF THE DRAWINGS

Various embodiments will be described in detail with reference to the following drawings in which like reference numerals refer to like elements, wherein:

FIGS. 14 shows an example method for determining a tolerable and/or sufficient physical length of a fiber optic cable;

FIG. 15 shows an example method for determining an operable search window size for a desired physical length of the fiber optic cable;

DETAILED DESCRIPTION

Embodiments are disclosed that determine the relationship between search window sizes and the amount of propagation delay that can be tolerated between a repeater and a base station in a communication system. In one embodiment, a relationship between search window sizes and the amount of propagation delay that can be tolerated between a repeater attached to a base station using physical link, such as a fiber optic link, is determined. In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

It is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In addition, the term "repeater" refers to a system or device that receives, amplifies, and retransmits a wireless signal without extracting the user information or converting the communication protocol. For example, Code Division Multiple Access (CDMA) base station receives and decodes CDMA signals to extract user information. The CDMA base station then transmits another signal with the extracted user information. The CDMA base station may use a different protocol to transmit the other signal.

I. Exemplary Operational Environment

Figure 1:
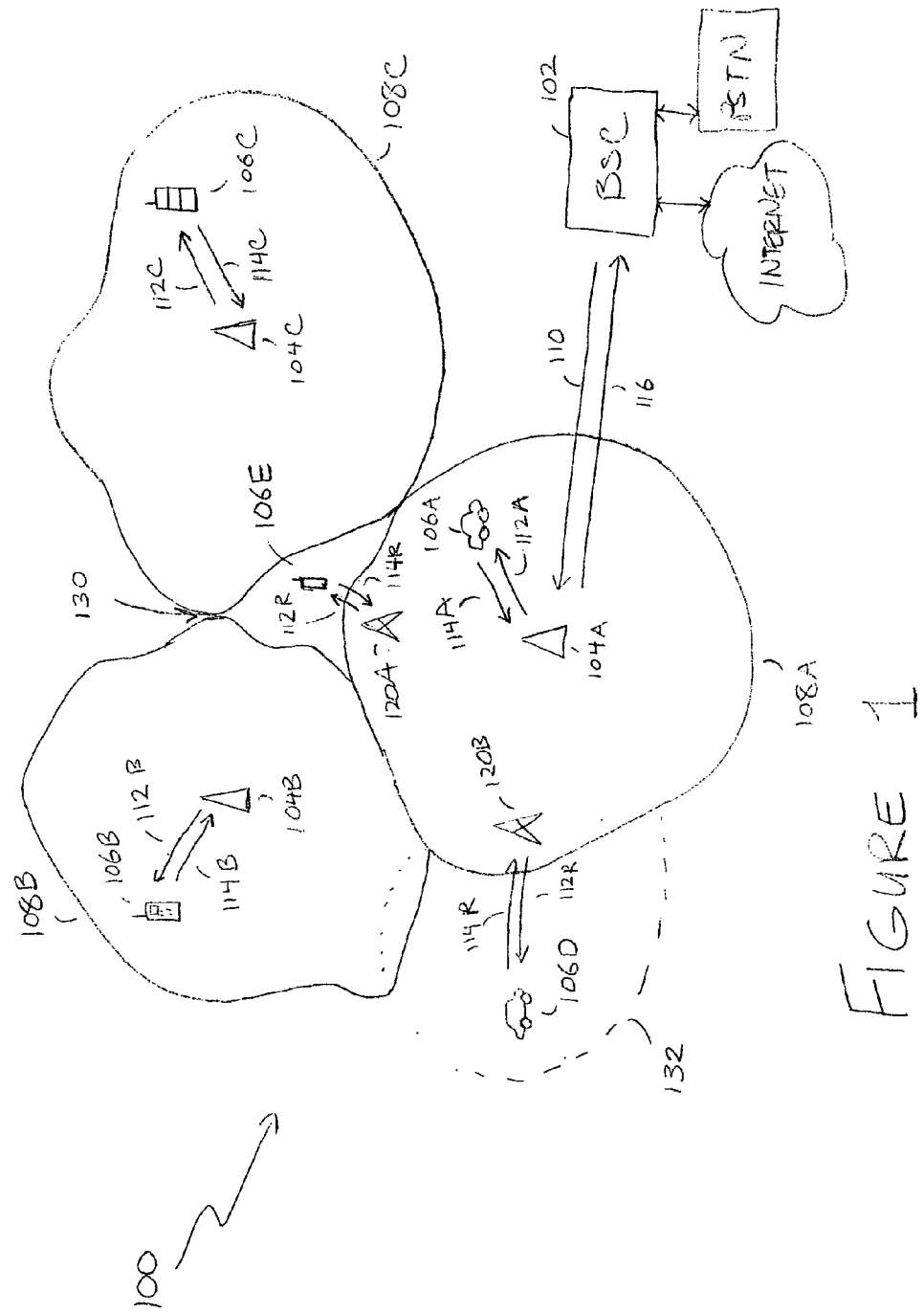
FIG. 1 shows an example of a wireless communication network including a repeater.

FIG. 1 illustrates an example of a wireless communication network (hereinafter "network") 100 using one or more control stations 102, sometimes referred to as base station controllers (BSC), and a plurality of base stations 104A-104C, sometimes referred to as base station transceiver system (BTS). Base stations 104A-104C communicate with remote stations or wireless communication devices 106A-106C that are within service areas 108A-108C of base stations 104A-104C, respectively. In the example, base station 104A communicates with remote station 106A within service area 108A, base station 104B with remote station 106B within service area 108B, and base station 104C with remote station 106C within service area 108C.

Base stations transmit information in the form of wireless signals to user terminals across forward links or forward link communication channels, and remote stations transmit information over reverse links or reverse link communication channels. Although FIG. 1 illustrates three base stations 104A-104C, other numbers of these elements may be employed to achieve a desired communications capacity and geographic scope, as would be known. Also, while fixed base stations are described, it is to be appreciated that in some applications, portable base stations and/or stations positioned on movable platforms such as, but not limited to, trains, barges or trucks, may be used as desired.

Control station 102 may be connected to other control stations, central system control stations (not shown) for network 100 or other communication systems such as a public switched telephone network (PSTN) or the Internet. Thus, a system user at remote station 106 is provided with access to other communication portals using network 100.

Remote stations 106A-106C each have or comprise apparatus or a wireless communication device (WCD) such as, but not limited to, a cellular telephone, a wireless handset, a data transceiver, or a paging or position determination receiver. Furthermore, such remote stations can be hand-held, portable as in vehicle mounted (including cars, trucks, boats, trains, and planes) or fixed, as desired. In FIG. 1, remote station 106A is a portable vehicle mounted telephone or WCD, remote station 106B is a hand-held apparatus, and remote station 106C is a fixed device.

In addition, the teachings of the embodiments are applicable to wireless devices such as one or more data modules or modems which may be used to transfer data and/or voice traffic, and may communicate with other devices using cables or other known wireless links or connections, for example, to transfer information, commands, or audio signals. Commands may be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as 'users,' 'phones,' 'terminals,' or 'mobiles' in some communication systems, depending on preference.

In the present example environment, remote stations 106A-106C and base stations 104A-104C engage in wireless communications with other elements in network 100 using CDMA communication techniques. Therefore, signals transmitted across the forward (to the remote stations) and reverse links (from the remote stations) convey signals that are encoded, spread, and channelized according to CDMA transmission standards.

Also, each base station 104 has a respective service area 108 (108A-108C) which can be generally described as the geographical extent of a locus of points for which a remote station 106 can communicate effectively with the base station.

The service area of a base station is illustrated as generally circular or elliptical in FIG. 1 for convenience. In actual applications, local topography, obstructions (buildings, hills, and so forth), signal strength, and interference from other sources dictate the shape of the region serviced by a given base station. Typically multiple coverage areas 108 (108A-108C) overlap, at least slightly, to provide continuous coverage or communications over a large area or region. That is, in order to provide an effective mobile telephone or data service, many base stations would be used with overlapping service areas.

One aspect of the communication network coverage illustrated in FIG. 1, is the presence of an uncovered region 130, which can often be referred to as a hole, or an uncovered region 132 which is simply outside of network 100 normal coverage areas. In the case of a "hole" in coverage, there are areas surrounding or at least adjacent to the covered areas which can be serviced by base stations, here base stations 104A-104C. However, as discussed above a variety of reasons exist for which coverage might not be available in regions 130 or 132.

For example, the most cost effective placement of base stations 104A-104C might place them in locations that simply do not allow their signals to reliably reach or cover regions 130 or 132. Alternatively, topological features such as mountains or hills, man made structures, such as tall buildings or urban canyons often created in central urban corridors, or vegetation, such as tall trees, forests, or the like, could each partially or completely block signals. Some of these effects can be temporary, or change over time, to make system installation, planning, and use even more complex.

In many cases, it may also be more amenable to using several repeaters to cover unusually shaped regions or circumvent the problems of blockage. In FIG. 1, one or more repeaters 120 (120A, 120B) accept transmissions from both a remote station 106 (106D and 106E) and a base station 104 (104A), and act as an intermediary between the two, essentially operating as a "bent pipe" communication path. Using a repeater 120, the effective range of a base station 104 is extended to cover service areas 130 and 132.

Figure 2:
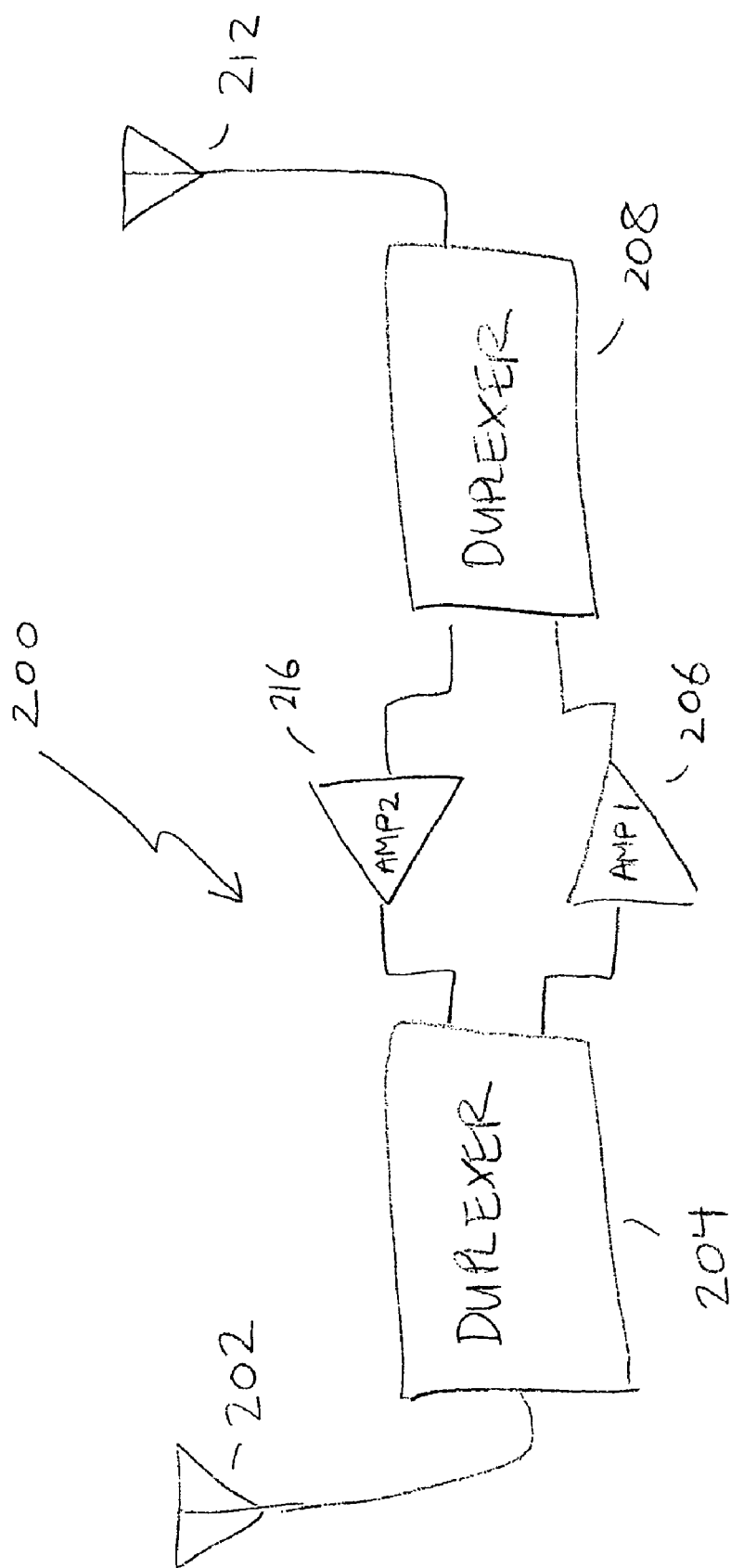
FIG. 2 shows an example of a repeater.

Some repeaters 120 may be in communication with a base station 104 wirelessly and some repeaters 120 may be in communication with a base station 104 using a physical link such as a coaxial link or fiber optic link. FIG. 2 shows a simplified block diagram of a repeater 200. A more typical commercial repeater may have additional components including additional filtering and control elements to control noise, out of band emissions, and to regulate the gain.

Repeater 200 comprises a donor antenna 202 for receiving and transmitting signals to and from a base station, a duplexer 204, an amplifier 206 for amplifying signals received at donor antenna 202, a second duplexer 208, and a server or coverage antenna 212 for transmitting (or repeating) signals received by antenna 202 repeater 200. A second amplifier 216 is also included which amplifies the reverse link signals received at server antenna 206, and provides the amplified signals to donor antenna 202.

The two duplexers (204, 208) are used to split or separate the forward link and reverse link signals (frequencies) to provide necessary isolation between the two so that they do not enter the other processing chains of repeater 200. That is, to prevent transmissions from entering receivers, and so forth, and degrading performance. The receive or receiver duplexer (204) is coupled to an antenna referred to as a donor antenna (202), since it receives signals "donated" from another source, such as a base station, also referred to as a donor cell. The donor is more typically a sector within a cell. The antenna coupled to the duplexer (208) on the transmission or output side of the repeater processing is referred to as the server or coverage antenna (212).

II. PN Offsets

In IS-95 and CDMA2000-based networks, base stations 104 are synchronized to a common time base. The forward link signals of each sector are covered with a pseudorandom noise (PN) code that is 215 chips in length. The PN code, known as the short code, is time synchronized relative to the system time wherein each sector broadcasts the same short code with different time offsets relative to system time. This time offset is used by remote stations 106 to identify and distinguish sectors within the network. More particularly, the pilot signal (Walsh code zero) is the code channel that is the object of searching by a remote station 106 as it looks for neighboring sectors while traversing the network.

Figure 3:
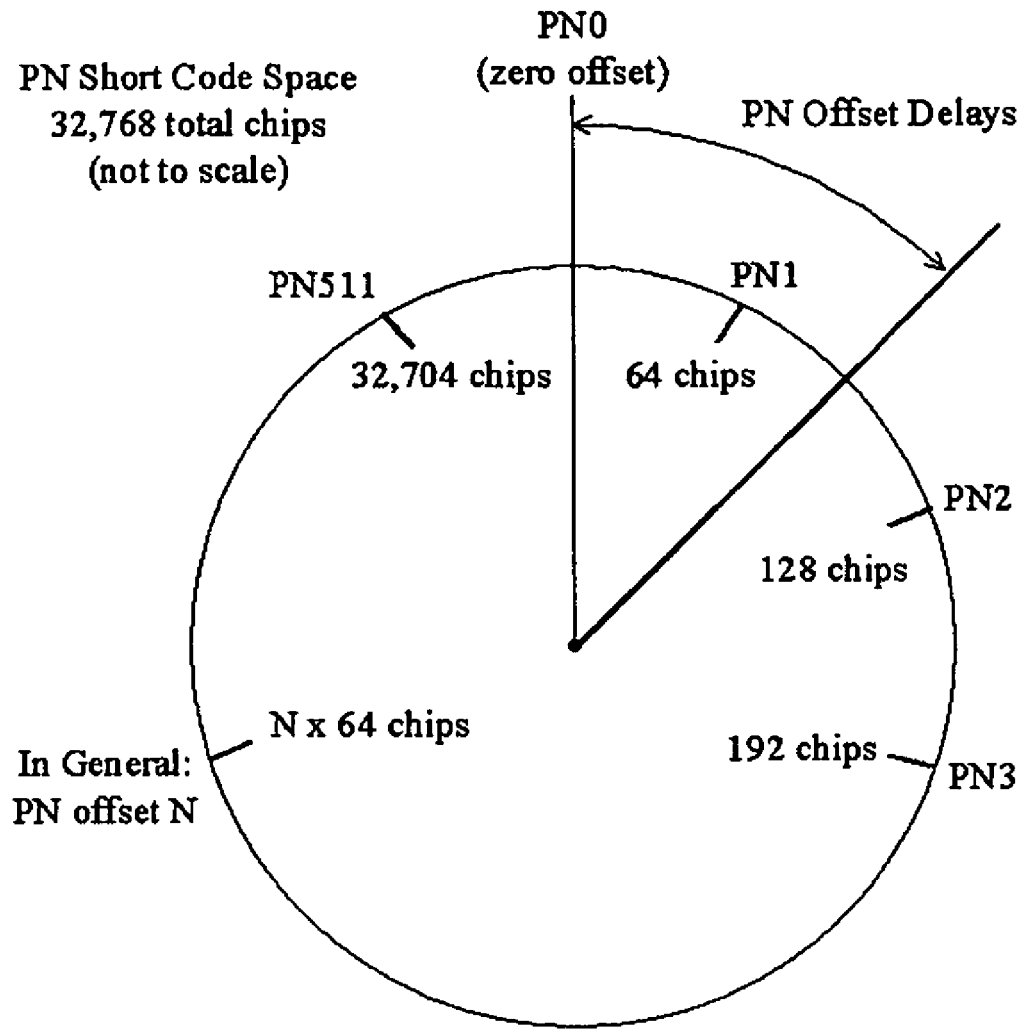
FIG. 3 shows an example PN short code space.

FIG. 3 represents an example PN short code space. The circle represents the 32,768 chip short code that repeats itself every 26.667 ms. Valid time offsets for a base station sector are modulo 64 chips. Therefore, there are 512 PN offsets in the set of possible delay assignments for sectors.

III. Search Windows

The searcher function within a remote station rake receiver constantly searches for multipath signals and for neighboring sectors. A neighbor list that is transmitted to the remote station during both Traffic and Idle states controls the neighbor searching. Generally, the neighbor list contains a list of PN code time offsets over which the searcher function within the remote station is to search. A correlator within the rake receiver will search over the different time offsets given in the list. The search is taken by integrating over a span of chips, looking for correlation at each chip offset. This span of chips is known as a search window.

If the correlation energy is detected within this span, then a correlation of received pilot energy at that given time delay has occurred. There are three different search window sizes within a remote station.

A search window used for pilots in an Active Set (SRCH_WIN_A)

A search window used for pilots in a Neighbor Set (SRCH_WIN_N)

A search window used for pilots in a Remaining Set (SRCH_WIN_R)

The sizes of these search windows are sent to remote stations using an overhead message during the Idle state. Table 1 lists the size ranges for these search windows.

TABLE 1

| SRCH_WIN_A SRCH_WIN_N SRCH_WIN_R | Window Size (PN chips) |
|---|---|
| 0 | 4 |
| 1 | 6 |
| 2 | 8 |
| 3 | 10 |
| 4 | 14 |
| 5 | 20 |
| 6 | 28 |
| 7 | 40 |
| 8 | 60 |
| 9 | 80 |
| 10 | 100 |
| 11 | 130 |
| 12 | 160 |
| 13 | 226 |
| 14 | 320 |
| 15 | 452 |

The following embodiments are concerned primarily with the Active Set and Neighbor Set searches. The Remaining Set search generally has little impact on the system. Also, the IS-95 standard indicates that if a remote station receives an active search window size that is greater than or equal to 13, the remote station may store and use the value 13 Although this is not a strict requirement for all remote station vendors, this condition effectively limits the active search window size to 226 chips. Active search window sizes in the range of 40 to 80 chips are typical.

IV. Remote Station Timing Relative to Base Station

The sense of timing of a remote station varies as it travels about a service area. Each remote station will establish its own internal sense of system time based on the earliest arriving multipath component of a sector or sectors with which it is in communication. However, due to propagation delays, this sense of system time will vary based on the propagation distance between the sector antennas to the remote station antenna.

Figure 4:
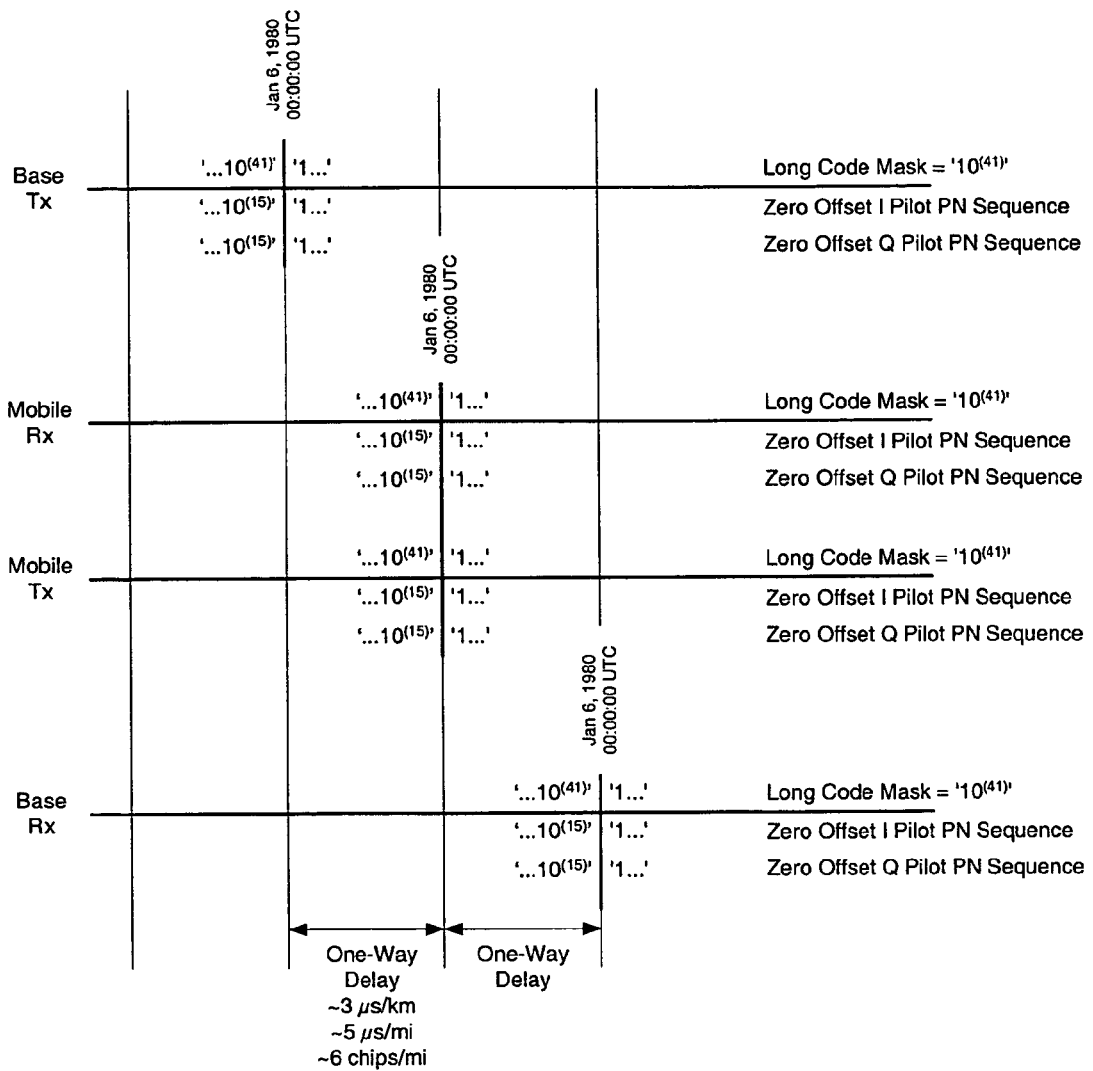
FIG. 4 shows the timing offsets between a base station and a remote station due to propagation delays.

FIG. 4 shows the timing offsets between the base station and the remote station due to propagation delays. The one-way delays represents the time it takes for a signal to propagate from the base station antennas to the remote station antenna. In term, of chips delay is approximately 4 chips/km.

Figure 5:
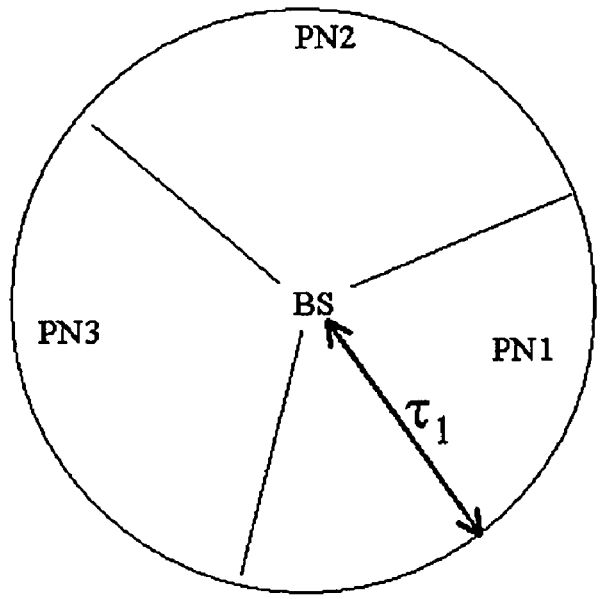
FIG. 5 shows three sectors of a base station with PN offsets.

For example, assume that a remote station has traveled to the edge of a service area having sectors broadcasting PN offset 1 or PN1, PN offset 2 or PN2 and PN offset 3 or PN3. FIG. 5 shows three sectors of a base station with PN offsets PN1, PN2, and PN3. The time delay between the base station antennas to the remote station location at edge of coverage will be called $\tau_1$. Thus, the remote station sense of system time will be delayed by an offset of $\tau_1$ seconds.

Figure 6:
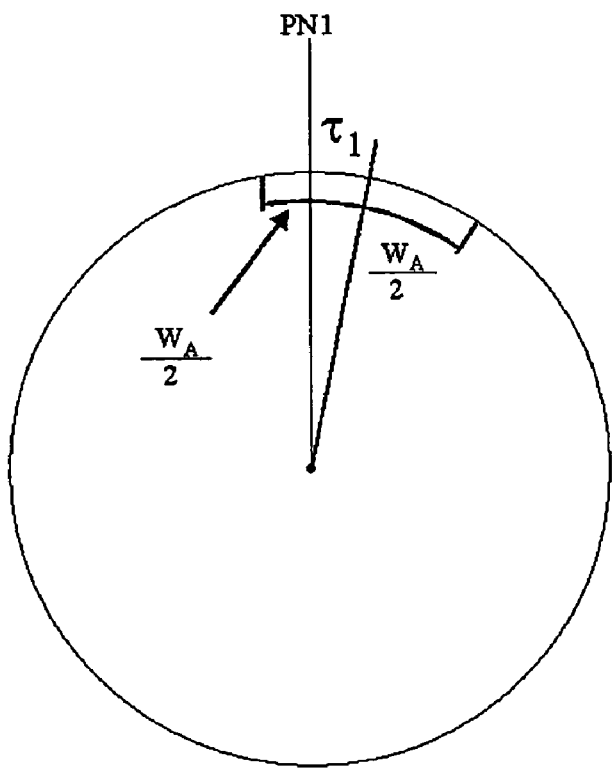
FIG. 6 shows the relative timing of the system time for a remote station due to propagation delays.

FIG. 6 shows the relative timing where the system time (as referenced to the base station antennas) has PN1 denoted by the vertical line labeled PN1. The remote station will receive PN1 delayed by $\tau_1$ seconds. This will be the reference by which the remote station will establish its internal system clock. FIG. 6 shows the system time of the remote station is delayed from the true (base station) system time by the delay, $\tau_1$. Note that the remote station Active Set search window is centered about the remote station's sense of PN1. The remote station centers the search window at the chosen location in PN space. In this way, the remote station searches ahead and behind by half the window size or WA/2.

V. Repeaters in CDMA Networks

The impact of a repeater will now be discussed below. Although the embodiments may be applicable to repeaters in wireless communication with base stations, for purpose of explanation, the embodiments will be discussed with reference to a repeater in communication with a base station using a physical link. Particularly, a repeater attached to a base station using a fiber optic link will be used as an example.

Moreover, two cases will be analyzed. In the first case, a remote station operation as it transitions between the base station coverage area and the coverage area of a repeater that is in the same sector will be considered. In this case, the PN offset, having the same source, is the same in both the base station sector coverage area and the repeater coverage area. In the second case, remote station operation as it transitions between the base station coverage area and the coverage area of a repeater that is in a different sector will be considered. This case analyzes the situation in which the PN offset of the base station sector is different from the PN offset being broadcast into the repeater coverage area.

A. Case 1: Repeater & Adjacent Sector Broadcast Same PN Offset

Figure 7:
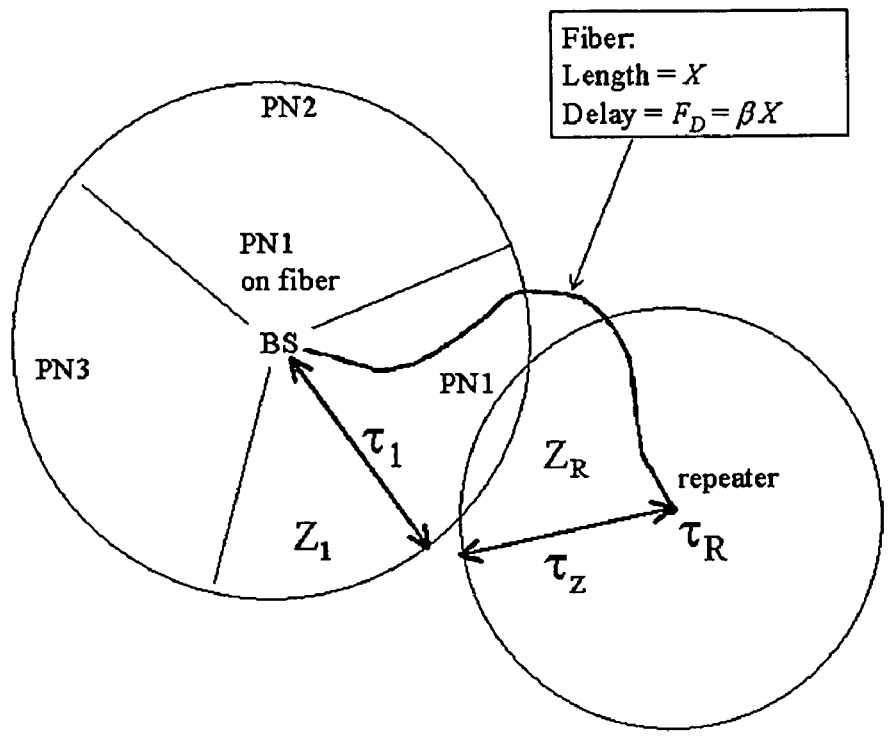
FIGS. 7-9 show the relative timing for a remote station when a repeater and an adjacent sector broadcast a same PN Offset.

As PN offsets are generally equivalent, an arbitrary PN offset for the base station sector can be assumed without loss of generality. Also, assume that the repeater and the adjacent sector broadcast PN offset 1. FIG. 7 shows an example configuration to be analyzed for Case 1. The repeater is attached to the sector broadcasting PN1. The sector radius is defined to have a delay of $\tau_1$ seconds. $Z_1$ is the area over which PN1 has coverage. Adjacent to area $Z_1$ is the coverage area of the repeater, $Z_R$. The propagation delay between the repeater and the edge of repeater coverage has a value of $\tau_Z$ seconds.

The repeater itself has some delay associated with it, primarily the result of filter components used within the repeater. Some repeaters may have a significant delay, particularly if they use saw filters for channelization. Other repeaters may not contain significant delay. To keep the analysis as general as possible, the repeater is assumed to have a delay of $\tau_R$.

Finally, the delay produced by the length of fiber optic cable is as follows. The propagation velocity through a fiber optic cable is less than that of free-space propagation. In general, the reduction in propagation velocity is a function of the refractive index of the fiber material and mode of propagation. For the purposes of explanation, assume that the ratio of fiber delay to fiber length is a constant, $\beta$. The units of $\beta$ are seconds per kilometer. As $\beta$ is proportional to the index of refraction, typical values are in the range of 1.45 to 1.47. Thus, the propagation velocity in the fiber will be approximately ⅔ that of the free-space propagation velocity. Having defined $\beta$, the fiber delay, FD, can be related to the fiber length, X, by the constant $\beta$, as follows:

$$F_D = \beta X \quad (1)$$

where $F_D$=delay through the fiber optic link in seconds
$\beta$=ratio of fiber delay to fiber length
X=physical length of the fiber optic cable Consider the event in which the remote station travels from the repeater coverage area $Z_R$, into the sector coverage area $Z_1$. First, the delay relative to system time of the signal that reaches the remote station just before it leaves the repeater coverage area $Z_R$ and begins to transition into the sector coverage area $Z_1$ is determined. This delay is the sum of the fiber delay, repeater delay, and propagation delay between the repeater and the remote station as follows:

$$\text{Delay} = F_D + \tau_R + \tau_Z \quad (2)$$

where $\tau_R$=internal delay of the repeater; and
$\tau_Z$=propagation delay from the repeater to the point at which the remote station is transitioning to the base station sector coverage area.

Figure 8:
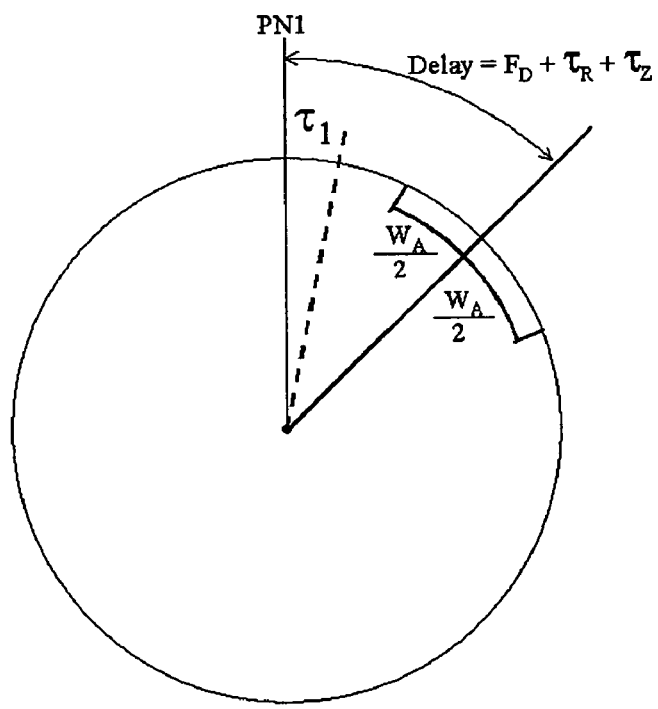

At this delay relative to system time, the remote station will attempt to find the forward link signal broadcast directly from the base station sector. As discussed, the signals arriving at the edge of sector coverage will also be delayed by an amount $\tau_1$. The remote station will place the center of its Active Set search window, SRCH_WIN_A, at the time delay shown in FIG. 8. As the remote station approaches the sector area $Z_1$, it will find the forward link from the base station sector if the energy arrives within this search window. By examining FIG. 8, this mathematically translates as follows:

$$\text{Delay} - \frac{W_A}{2} \leq \tau_1 \quad (3)$$

where $W_A$=Active Set search window size in time; and
$\tau_1$=propagation delay from the base station antenna to the point at which the remote station is transitioning from the repeater coverage area.

Thus, a maximum delay that can be tolerated in a fiber connected repeater environment is established. It then follows:

$$F_D \leq \tau_1 - \tau_Z - \tau_R + \frac{W_A}{2} \quad (4)$$

From this relationship, the maximum fiber delay for Case 1 is shown to be a function of the active search window size, $W_A$, summed with the difference between the propagation delay to the edge of the sector and the propagation delay from the repeater to the edge of repeater coverage plus the delay through the repeater, $\tau_R$.

If the repeater delay is assumed negligible, then the above relationship can be modified to show that the maximum fiber delay is a function of the active search window size and the difference between the propagation delays of the sector and the repeater as follows:

$$F_D \leq (\tau_1 - \tau_Z) + \frac{W_A}{2} \quad (5)$$

Recall that the propagation delays are directly proportional to the sector and repeater coverage radii. In general, repeaters have less transmit power than base station sectors. Therefore, the propagation distance is less than the propagation distance of base station sectors. Recalling that the physical length of the fiber is a function of the propagation constant $\beta$, Equation (4) can be re-written to specify the maximum length of the optical fiber as follows:

$$F_D = \beta X \leq \tau_1 - \tau_Z - \tau_R + \frac{W_A}{2} \quad (6)$$

$$X \leq \frac{\tau_1 - \tau_Z - \tau_R + \frac{W_A}{2}}{\beta}$$

In summary, adhering to the relationship above will guarantee that the remote station searcher will be able to find the forward link signals from the sector as it transitions from $Z_R$ to $Z_1$.

While the above analysis refers to the Active Set search window, the analysis also applies to a remote station that is in a call during the transition between $Z_R$ and $Z_1$. For the remote station in the Idle state, a similar relationship could be formed using the Neighbor Set search window size, SRCH_WIN_N. This may not be required, because it is usually true that:

SRCH_WIN_A≦SRCH_WIN_N≦SRCH_WIN_R

As such, the relationship of Equation (6) sets the maximum for the fiber optic cable length to be used for a remote station in both the traffic and the idle conditions.

However, the dual event in which the remote station travels from the sector coverage area $Z_1$ into the repeater coverage area $Z_R$ should also be considered. Following the same procedure as before, the delay relative to system time of the signal that reaches the remote station just before it leaves the sector coverage area $Z_1$ and begins to transition into the repeater coverage area $Z_R$ is determined. This is the delay $\tau_1$ that was identified previously.

The remote station will center its Active Set search window, SRCH_WIN_A, at the time delay $\tau_1$ as it begins to transition from the sector area $Z_1$ to the repeater area $Z_R$. The forward link signals from the repeater will be delayed as they were above, namely Delay=$F_D+\tau_R+\tau_Z$.

Figure 9:
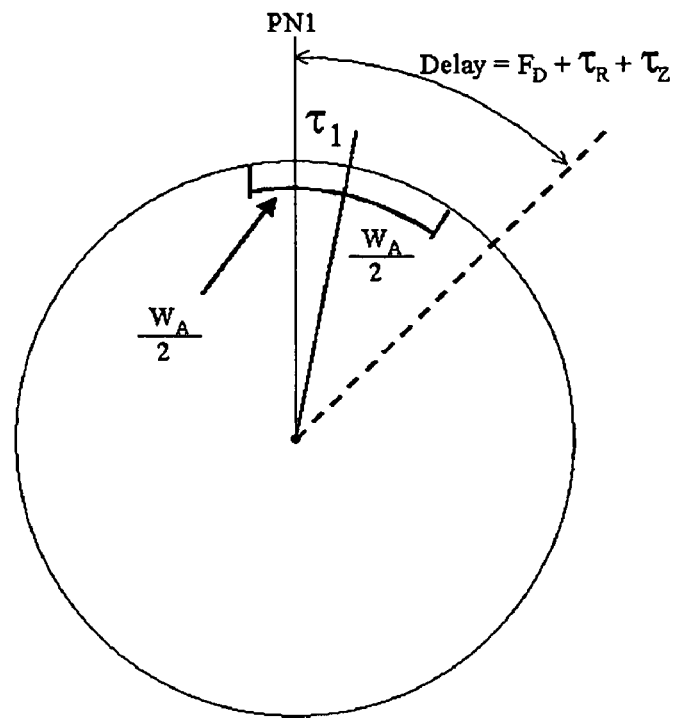

Once again, the remote station searcher function should locate these delayed forward link signals, and they should arrive within the Active Set search window to successfully transition from $Z_1$ to $Z_R$. FIG. 9 shows the relative timing of these signals. In this case, a requirement is established such that the delayed signals from the repeater fall within the Active Set search window of the remote station with its timing delayed by $\tau_1$ relative to system time. Mathematically, this can be written as follows:

$$\text{Delay} \leq \tau_1 + \frac{W_A}{2} \quad (7)$$

This is the same relationship as Equation (3) that was developed when considering the transition of the remote station from the repeater coverage area $Z_R$ into the sector coverage area $Z_1$. As might be expected, when the requirements for a remote station transitioning in one direction is satisfied. Also the requirements for a remote station transitioning in the other direction is satisfied.

B. Case 2: Repeater & Adjacent Sector Broadcast Different PN Offsets

In the second case, a remote station transitions between a sector broadcasting a given PN offset and a repeater coverage area in which the repeater is broadcasting a different PN offset. This is the case when a repeater is used to provide coverage from a sector of the base station that is different from the one adjacent to the repeater coverage area. Case 2 differs from Case 1 in that with Case 2, the repeater is broadcasting a completely different forward link from that of the base station sector of interest.

Figure 10:
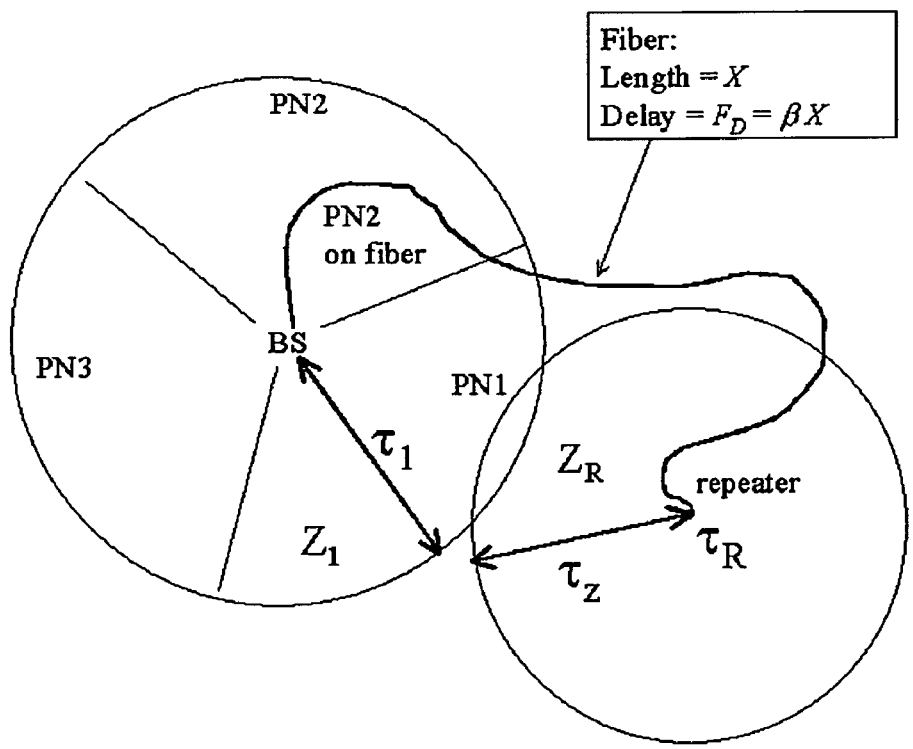
FIGS. 10 and 11 show the relative timing for a remote station when a repeater and an adjacent sector broadcast a different PN Offset.

Assuming again that the PN offsets are equal, for purposes of explanation, PN offset PN1 is selected for the $Z_1$ coverage area. The PN offset being rebroadcast from the repeater can also be arbitrary. The next adjacent PN offset, PN2 is also selected for purposes of explanation. FIG. 10 shows the environment that is used for analysis.

First, consider the event in which the remote station travels from the repeater coverage area $Z_R$ into the sector coverage area $Z_1$. Again, the delay relative to system time of the signal that reaches the remote station just before it leaves the repeater coverage area $Z_R$ is determined. As before, this delay is the sum of the fiber delay, repeater delay, and propagation delay between the repeater and the remote station, namely Delay=$F_D+\tau_R+\tau_Z$.

Figure 11:
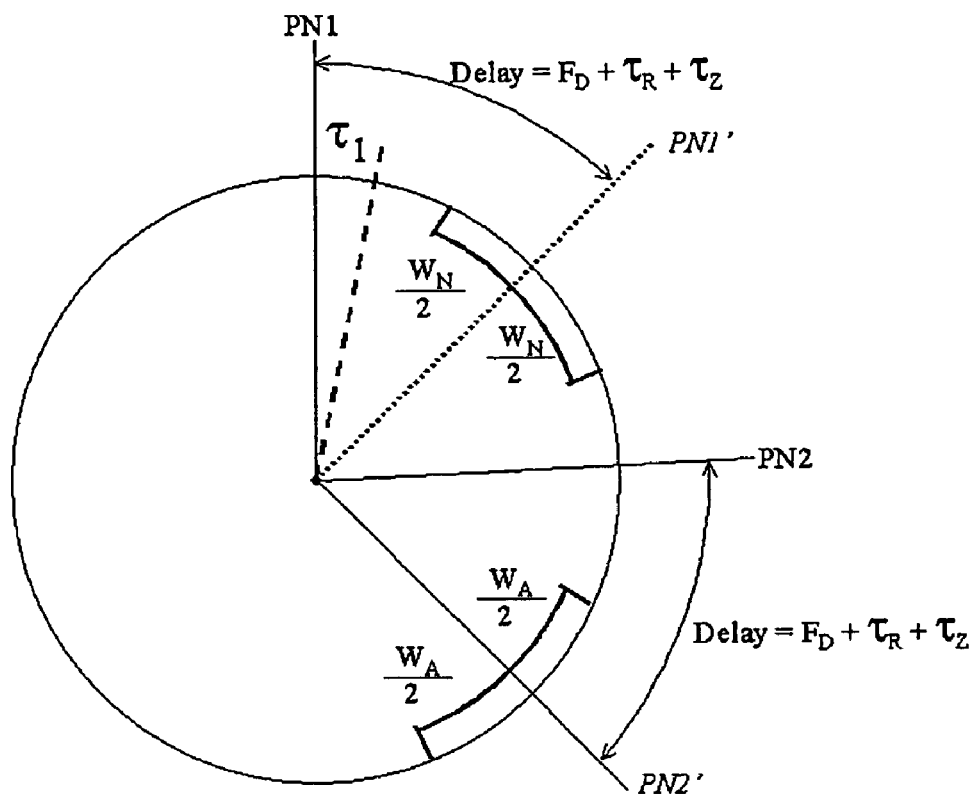

The remote station will operate at this delay relative to system time while attempting to find the forward link signals being broadcast directly from the base station sector. Under the conditions of Case 2, these forward link signals are from a different PN offset, PN2. FIG. 11 shows this scenario.

The remote station will place the center of its Active Set search window at the time delay labeled PN2'. As the remote station approaches the sector area $Z_1$, it will see the forward link from the base station sector if the energy arriving falls into the Neighbor Set search window used for searching for PN offset 1.

PN1 should be in the neighbor list of PN2. Otherwise, the remote station will not search for PN1 and will not find this sector when it is time to make the transition. Case 2 also requires that a Pilot Strength Measurement Message (PSMM) be reported from the remote station, and the remote station be granted soft handoff with PN1 by the network. This was not required in Case 1 because the call existed on the sector PN1, and thus existed in both the sector coverage area $Z_1$ and the repeater coverage area $Z_R$. Case 2 is a soft handoff situation and steps should be taken to ensure that the neighbor lists are correct and that there is an adequate transition boundary. In this way, the network equipment can perform the usual soft handoff functions of processing PSMMs and setting up of traffic channels.

By examining FIG. 11, the required mathematical formulations can be determined from which to derive the maximum fiber optic cable length. As stated, the remote station's sense of system time is delayed by the sum of the fiber delay, repeater delay, and propagation delay from the repeater to the remote station. This means that when the remote station attempts to locate its neighbor pilot, it will center its Neighbor Set search window, SRCH_WIN_N, at the delay value labeled PN1'. Thus, if the remote station searcher function is to find the PN1 energy broadcast from the sector, the total delay through the repeater to the edge of repeater coverage less one half of the Neighbor Set search window size should be less than or equal to the delay from the base station antennas to the edge of sector coverage. Mathematically, this can be written as:

$$\text{Delay} - \frac{W_N}{2} \leq \tau_1 \quad (8)$$

where
$W_N$=Neighbor Set search window size in time.

This relation is similar in form to that derived in Case 1, except, this time the Neighbor Set search window size is in use. Under the condition that SRCH_WIN_A≦SRCH_WIN_N, transitioning between different PNs, as in this case, may permit slightly longer fiber optic cable lengths than in Case 1.

For completeness, the above relationship can be simplified to find:

$$F_D \leq \tau_1 - \tau_Z - \tau_R + \frac{W_N}{2} \quad (9)$$

This relationship can be expressed in terms of the physical fiber length as follows:

$$F_D = \beta X \leq \tau_1 - \tau_Z - \tau_R + \frac{W_N}{2} \quad (10)$$

$$X \leq \frac{\tau_1 - \tau_Z - \tau_R + \frac{W_N}{2}}{\beta}$$

Adhering to the relationship above will guarantee that the remote station searcher will be able to find the forward link signals from the sector as it transitions from $Z_R$ to $Z_1$ for the case in which the repeater and the sector are broadcasting different PN offsets. In other words, they are broadcasting different forward link signals. It should be noted that the event in which the remote station transitions from the sector coverage area to the repeater coverage area will yield the same relation derived above.

VI. Base Station Access Windows

Thus far, the function and relative timing of search windows, as they exist within the remote station, have been discussed. More particularly, the effect of delay on the search process of the remote station as it transitions into and out of repeater coverage areas has been considered, in both the Idle and Traffic states.

However, there is one other search window to consider with regard to access. This window exists within the base station and sets the maximum time delay over which the base station will attempt to identify and correlate an access attempt from a remote station. In other words, this search window sets the maximum two-way delay that the base station will search for an incoming access attempt. FIG. 4 shows this delay.

It is necessary to account for any added delay from the use of a fiber optic repeater in the base station Access window parameter settings. That is, the addition of fiber delay may require expanding the base station Access window to account for the added two-way delay. Without this addition, the base station may not process Access probes that originate from a remote station in the repeater coverage area, resulting in the inability of the remote station to access the network from within the repeater coverage area.

The exact ranges of this search window are not standardized. They are the domain of each vendor of CDMA network equipment. Accordingly, this window depends on the particular vendor of CDMA network equipment.

VII. Summary

Two formulas have been developed for determining the maximum fiber optic cable delay for a fiber optic repeater connected to a base station sector. There are two cases of interest. The first concerns the case in which the repeater carries the same PN offset (the same forward link) as the base station sector with which the remote station is in transition. In this case, the maximum fiber delay is given by Equation (6). The second case concerns the situation in which the repeater is rebroadcasting the forward link from a sector different from the one that the remote station is transitioning to or from. In this case, the maximum fiber optic cable length is given by Equation (10).

By assuming $\beta=1$, the embodiments can be applied to over-the-air repeaters or repeaters in wireless communication with base stations. This is because the same geometries and principles apply to timing and the system delays within the network and repeater. In such embodiments, the maximum propagation delay $P_D$ between a repeater and base station, when the repeater carries the same PN offset as the base station sector with which the remote station is in transition, may be written as below.

$$P_D \leq \tau_1 - \tau_z - \tau_R + \frac{W_A}{2} \qquad (11)$$

where $W_A$=Active Set search window size in time;

$\tau_1$=propagation delay from the base station antenna to the point at which the remote station is transitioning from the repeater coverage area;

$\tau_R$=internal delay of the repeater; and $\tau_Z$=propagation delay from the repeater to the point at which the remote station is transitioning to the base station sector coverage area.

Also, the maximum propagation delay $P_D$ between a repeater and base station, when the repeater is rebroadcasting the forward link from a sector different from the one that the remote station is transitioning to or from, may be written as below.

$$P_D \leq \tau_1 - \tau_z - \tau_R + \frac{W_N}{2} \qquad (12)$$

where $W_N$=Neighbor Set search window size in time.

VIII. Application

Figure 12:
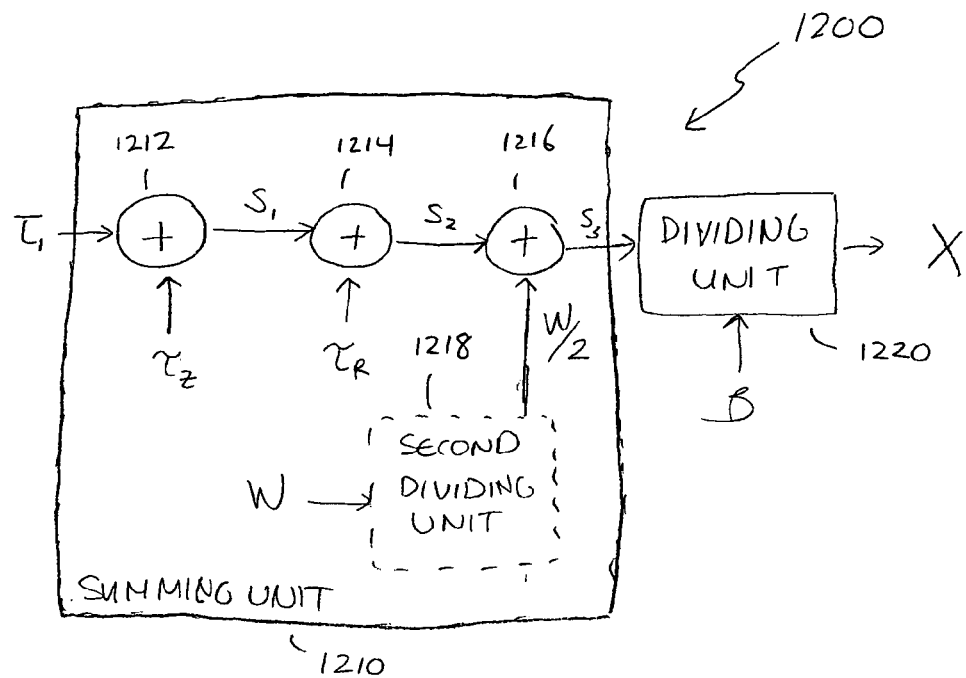
FIGS. 12 shows an example apparatus for determining a tolerable and/or sufficient physical length of a fiber optic cable.

FIG. 12 shows an example apparatus 1200 for a communication system, wherein a mobile station communicates to a base station through a repeater attached to the base station using a fiber optic cable. Apparatus 1200 may be used for determining a tolerable and/or sufficient physical length of the fiber optic cable. Apparatus 1200 may comprise a summing unit 1210 and a dividing unit 1220.

Summing unit 1210 is configured to subtract a first propagation delay value $\tau_Z$ and an internal delay value $\tau_R$ of the repeater from a second propagation delay value $\tau_1$, and to add half of a desired search window size W to obtain a sum value $s_3$, wherein the first propagation delay value is a delay from the repeater to the mobile station and the second propagation delay value is a delay from the base station to the mobile station. More particularly, summing unit 1210 may comprise a summers 1212-1216. Summer 1212 is configured to subtract $\tau_Z$ from $\tau_1$ to obtain sum $s_1$. Summer 1214 is configured to subtract $\tau_R$ from sum $s_1$ to obtain sum $s_2$. Summer 1216 is configured to add half of W with $s_2$ to obtain $s_3$. Summing unit 1210 may further comprise a second dividing unit 1218 configured to divide W by two in order to obtain a half of the desired search window size W. It is to be noted that second dividing unit 1218 may be omitted by directly inputting a half of the desired search window size W. Also, summers 1212, 1214 and 1216 may be implemented in different orders without affecting the result of summing unit 1210. Furthermore, one or more of summers 1212, 1214 and 1216 may be implemented together.

Dividing unit 1220 is configured to divide sum $s_3$ by a ratio value $\beta$ of fiber optic cable delay value to fiber optic cable length. The result is the tolerable and/or sufficient physical length of the fiber optic cable.

Figure 13:
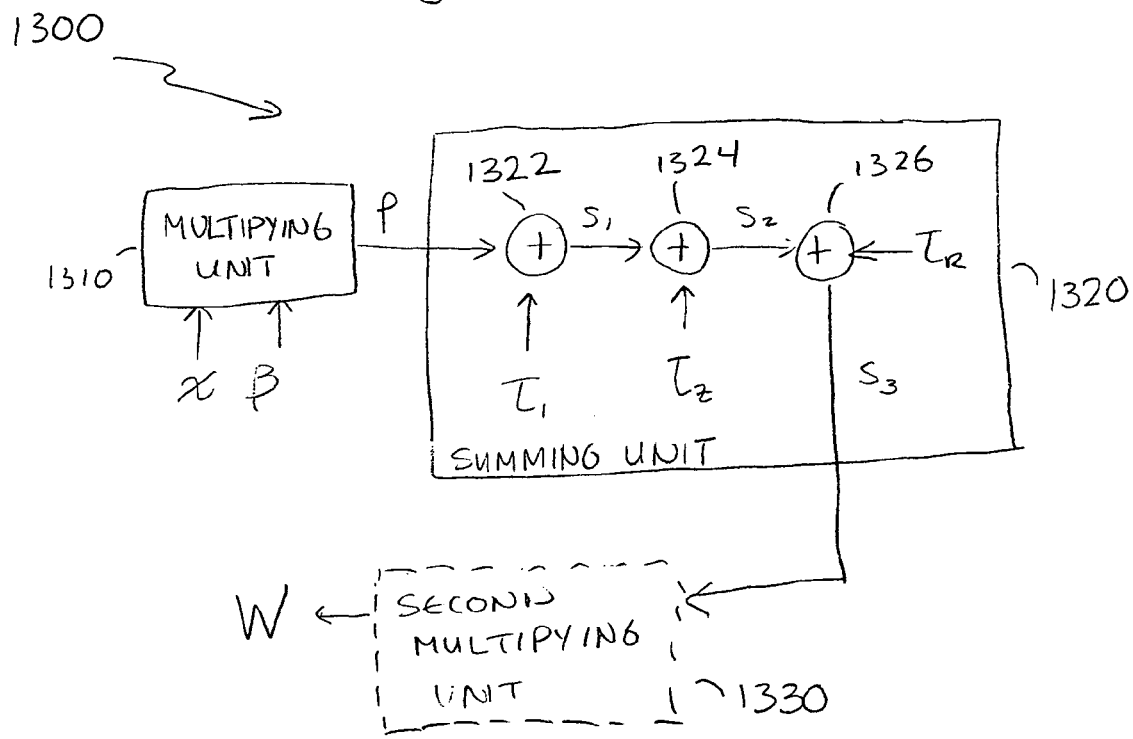
FIG. 13 shows an example apparatus for determining an operable search window size for a desired physical length of the fiber optic cable.

FIG. 13 shows an example apparatus 1300 for a communication system, wherein a mobile station communicates to a base station through a repeater attached to the base station using a fiber optic cable. Apparatus 1300 may be used for determining an operable search window size for a desired physical length of the fiber optic cable. Apparatus 1300 may comprise a multiplying unit 1310, a summing unit 1320 and a second multiplying unit 1330.

Multiplying unit 1310 is configured to multiply a desired length of the fiber optic cable x by a ratio value $\beta$ of fiber optic cable delay value to fiber optic cable length to obtain product value P.

Summing unit 1320 is configured to add a first propagation delay value $\tau_Z$ and an internal delay value $\tau_R$ of the repeater with P, and to subtract a second propagation delay value $\tau_1$ to obtain a sum value $s_3$. More particularly, summing unit 1320 may comprise a summers 1322-1326. Summer 1322 is configured to subtract $\tau_1$ from P to obtain sum $s_1$. Summer 1324 is configured to add $\tau_R$ with sum $s_1$ to obtain sum $s_2$. Summer 1326 is configured to add $\tau_R$ with $s_2$ to obtain $s_3$. It is to be noted that summers 1322, 1324 and 1326 may be implemented in different orders without affecting the result of summing unit 1320. Also, one or more of summers 1322, 1324 and 1326 may be implemented together.

Second multiplying unit 1320 is configured to double $s_3$ to obtain a desired search window size for x. However, second multiplying unit 1320 may be omitted in some embodiments in which P, $\tau_1$, $\tau_Z$ and $\tau_R$ are doubled and directly input to summers 1322-1326. In such case, $s_3$ would be the desired search window size for x.

FIG. 14 shows a method 1400 for use in a communication system, wherein a mobile station communicates to a base station through a repeater attached to the base station using a fiber optic cable. Method 1400 may be used to determine a tolerable length of fiber optic cable for a desired search window size.

Method 1400 may comprise determining a desired search window size W in time (1410). In some embodiments, method 1400 may comprise determining a range of search window sizes. In some other embodiments, method 1400 may comprise determining a plurality of search window sizes. A maximum fiber optic cable delay value $F_D$ is then determined based on the desired search window size (1420).

The maximum fiber optic cable delay value may be determined by determining a first propagation delay value $\tau_1$ from the base station to the mobile station, determining a second propagation delay value $\tau_Z$ from the repeater to the mobile station and determining an internal delay value $\tau_R$ of the repeater. The maximum fiber optic cable delay value can be determined based on the desired search window size, the internal delay value and the first and second propagation delay values.

More particularly, the maximum length of the fiber optic cable may be determined by subtracting the second propagation delay value and the internal delay value from the first propagation delay value to obtain a first sum value and adding half of the desired search window size and the first sum value to obtain a second sum value.

Referring back to FIG. 14, method 1400 further comprises determining a ratio value β of fiber optic cable delay value to fiber optic cable length (1430). Thereafter, a tolerable length of the fiber optic cable can be determined based on the maximum fiber optic cable delay value and the ratio value (1440). More particularly, the tolerable length of the fiber optic cable can be determined by dividing the second sum value by the ratio value.

FIG. 15 shows a method 1500 for use in a communication system, wherein a mobile station communicates to a base station through a repeater attached to the base station using a fiber optic cable. Method 1500 may be used to determine a search window size for a desired length of the fiber optic cable.

Method 1500 may comprise determining a desired length of the fiber optic cable (1510), determining a ratio value of fiber optic cable delay value to fiber optic cable length (1520), determining a first propagation delay value from the base station to the mobile station (1530), determining a second propagation delay value from the repeater to the mobile station (1540), determining an internal delay value of the repeater (1550) and determining a search window size based on the desired length of the fiber optic cable, the ratio value the internal delay value and the first and second propagation delay values (1560).

The search window size may be determined by multiplying the desired length of the fiber optic cable to the ratio value to obtain a fiber optic cable delay value, adding the second propagation delay value and the internal delay value with the fiber optic cable delay value to obtain a first sum value, subtracting the first propagation delay value from the first sum value to obtain a second sum value, and doubling the second sum value to determine the search window size.

It is to be noted that apparatus 1200 may be used to achieve method 1400 and apparatus 1300 may be used to achieve method 1500.

Figure 16:
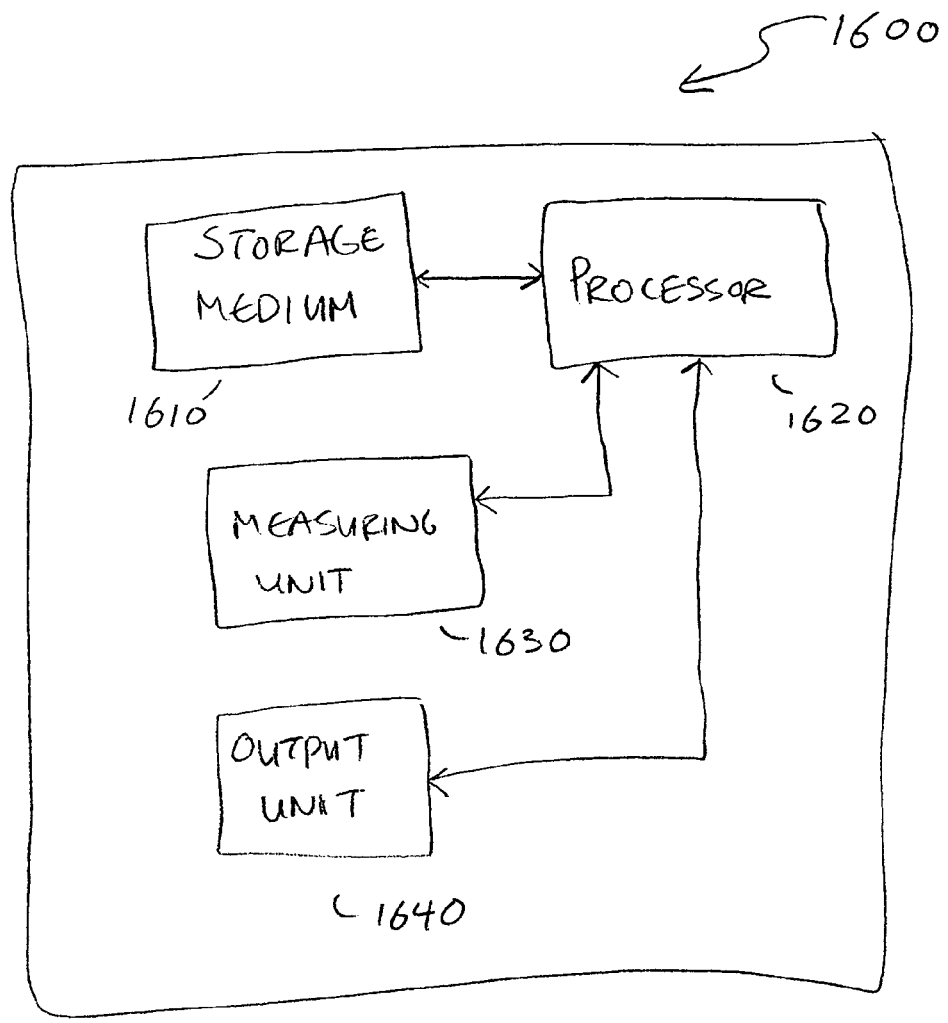
FIG. 16 shows an example apparatus for determining whether a length of a fiber optic cable is sufficient for a desired search window size.

Furthermore, FIG. 16 shows an example apparatus 1600 for a communication system, wherein a mobile station communicates to a base station through a repeater attached to the base station using a fiber optic cable. Apparatus 1600 may be used to determine whether a length of the fiber optic cable is sufficient for the desired search window size.

Apparatus 1600 may comprise a storage medium 1620 and a processor 1620. Storage medium 1610 is configured to store a first propagation delay value from the base station to the mobile station, a second propagation delay value from the repeater to the mobile station, an internal delay value of the repeater, and a desired search window size. Processor 1620 is coupled to storage medium 1610 and is configured to determine whether a length of the fiber optic cable is sufficient for the desired search window size, based on the first and second propagation delay values, the internal delay value and the desired search window size. Here, processor readable codes may be stored in storage medium 1610 that are executed by processor 1620 to determine whether a length of the fiber optic cable is sufficient for the desired search window size. In some embodiments, apparatus 1600 may implement apparatus (not shown) such as apparatus 1200 to determine whether a length of the fiber optic cable is sufficient for the desired search window size.

Apparatus 1600 may further comprise a measuring unit 1630 coupled to processor 1620 and configured to determine the physical length of the fiber optic cable. Namely, measuring unit 1630 measures and obtains the actual length of the fiber optic cable installed for attaching a repeater to a base station. Here, measuring unit 1630 may measure the length of the fiber optic cable after, while or as the fiber optic cable is being installed. The length of the fiber optic cable may be measured by any one of known techniques available.

In addition, apparatus 1600 may further comprise an output unit 1640 coupled to processor 1620 and is configured to output a signal to a user indicating that the length of the fiber optic cable is not sufficient for the desired window size. Examples or output unit 1640 may be, but is not limited to, a display, a audio device or an LED.

Therefore, apparatus 1600 may be used by a field technician in installing a fiber optic cable to attach a repeater to a base station.

Figure 17:
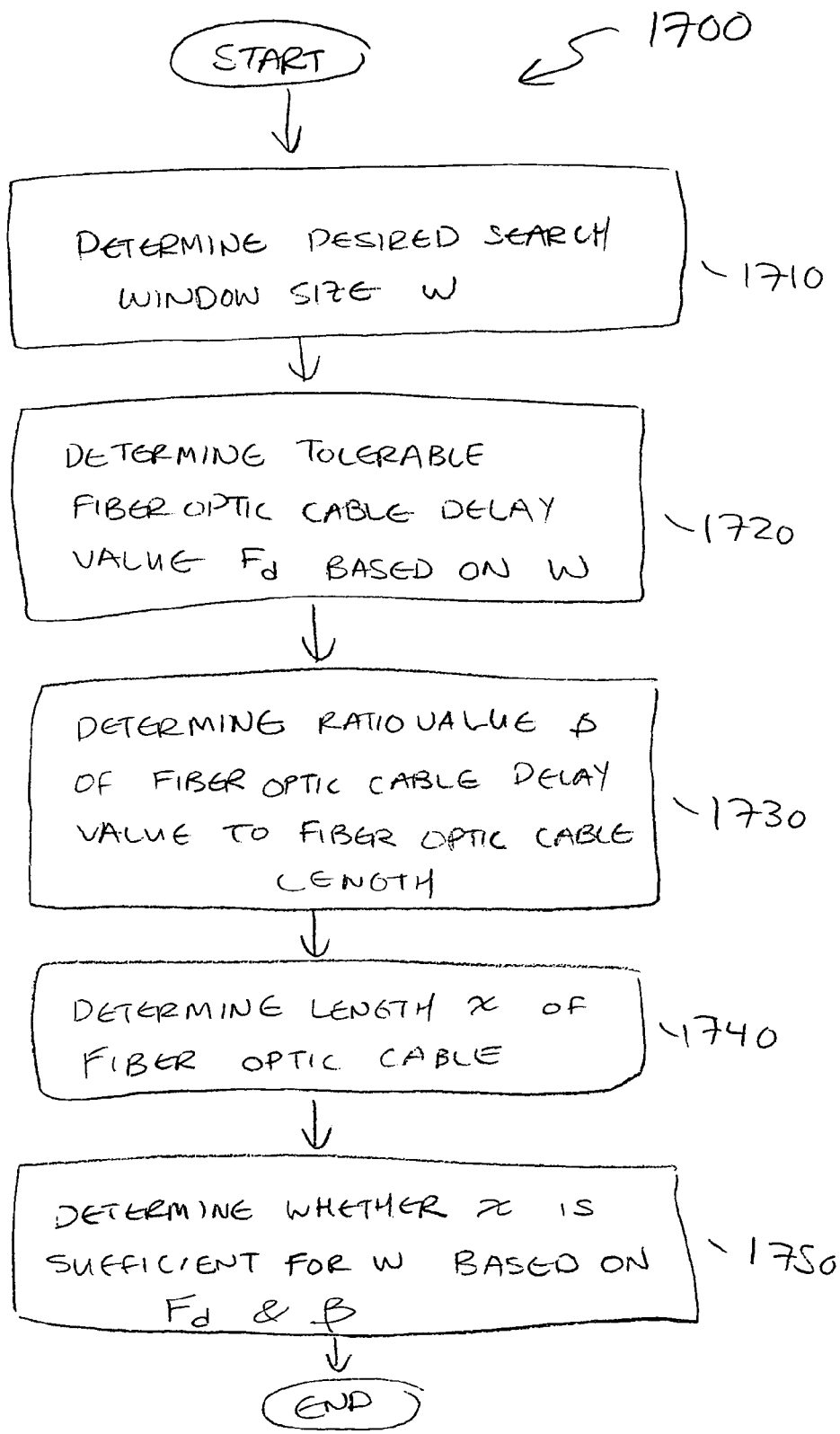
FIG. 17 shows an example method for determining whether a length of the fiber optic cable is sufficient for a desired search window size.

FIG. 17 shows a method 1700 for use in communication system, wherein a mobile station communicates to a base station through a repeater attached to the base station using a fiber optic cable. Method 1700 may be used for determining whether a length of the fiber optic cable is sufficient for a desired search window size.

Method 1700 may comprise determining a desired search window size in time (1710), determining a tolerable fiber optic cable delay value based on the desired search window size (1720), determining a ratio value of fiber optic cable delay value to fiber optic cable length (1730), determining a length of the fiber optic cable (1740), and determining whether the length of the fiber optic cable is sufficient for the desired search window size, based on the tolerable fiber optic cable delay value and the ratio value (1750).

Here, the length of the fiber optic cable may be determined while installing the fiber optic cable to attach the repeater to the base station. Similarly the determination of whether a length of the fiber optic cable is sufficient may be made while installing the fiber optic cable to attach the repeater to the base station.

Also, the tolerable fiber optic cable delay value may be determined by determining a maximum fiber optic cable delay for the desired search window size. The maximum fiber optic cable delay value may then be determined by determining a first propagation delay value from the base station to the mobile station, determining a second propagation delay value from the repeater to the mobile station, and determining an internal delay value of the repeater. The maximum fiber optic cable delay value may be determined based on the desired search window size, the internal delay value and the first and second propagation delay values.

More particularly, a determination of whether the length of the fiber optic cable is sufficient may be made by subtracting the second propagation delay value and the internal delay value from the first propagation delay value to obtain a first sum value, adding half of the desired search window size with the first sum value to obtain a second sum value, and dividing the second sum value by the ratio value.

IX. Conclusion

As discussed above, a relationship between a search window size and the amount of fiber optic cable delay that can be tolerated has been presented for use in communication systems in which a repeater is attached to a base station using a fiber optic link. It is to be noted that a tolerable amount of fiber optic cable and/or length of fiber optic cable is any value less than or equal to the maximum amount of fiber optic cable delay and/or maximum length of fiber optic cable. Also, note that the values of $\beta$, $\tau b\,1$, $\tau Z$ and $\tau R$ may be input externally to apparatus 1200, 1300 and/or 1600 before, while and after a fiber optic cable has been used to attach a repeater to a base station. These values may be estimated or may be obtained by any known techniques. Moreover, Apparatus 1200, 1300, or 1600 may, for example, be implemented in an independent device or tool that is used by users in the field when installing repeaters. Alternatively, Apparatus 1200 may also be implemented as part of a repeater and/or base station to aid users in the installation of repeaters.

In addition, although the embodiments have been described using a fiber optic link, it would be apparent to those skilled in the art that the embodiments may apply to other physical links such as, but not limited to, wires and coaxial cables. It should also be noted that the embodiments may apply to wireless links by assuming $\beta=1$ as discussed above.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as storage medium 1610 or in a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for use in a communication system, wherein a remote station communicates to a base station through a repeater attached to the base station using a physical link, the method comprising:
    determining a desired search window size in time;
    determining a maximum physical link delay value based on the desired search window size;
    determining a ratio value of a physical link delay value to physical link length;
    determining a tolerable length of the physical link based on the maximum physical link delay value and the ratio value; and
    installing the repeater within the communication system such that the physical link between the repeater and the base station is no greater than the determined tolerable length.

2. The method of claim 1, wherein determining the tolerable length of the physical link comprises:
    determining a maximum length of the physical link tolerated by the desired search window size.

3. The method of claim 2, wherein determining the maximum physical link delay value comprises:
    determining a first propagation delay value from the base station to the remote station;
    determining a second propagation delay value from the repeater to the remote station;
    determining an internal delay value of the repeater; and determining the maximum physical link delay value based on the desired search window size, the internal delay value and the first and second propagation delay values.

4. The method of claim 3, wherein determining the maximum length of the physical link comprises:
    subtracting the second propagation delay value and the internal delay value from the first propagation delay value to obtain a first sum value;
    adding half of the desired search window size with the first sum value to obtain a second sum value; and
    dividing the second sum value by the ratio value to determine the maximum length of the physical link.

5. The method of claim 1, wherein determining the desired search window size comprises:
    determining a range of search window sizes.

6. The method of claim 1, wherein determining the desired search window size comprises:
    determining a plurality of search window sizes.

7. The method of claim 1, wherein the physical link comprises a fiber optic cable.

8. A method for use in a communication system, wherein a remote station communicates to a base station through a repeater attached to the base station using a physical link, the method comprising:

determining a desired length of the physical link;
determining a ratio value of physical link delay value to physical link length;
determining a first propagation delay value from the base station to the remote station;
determining a second propagation delay value from the repeater to the remote station;
determining an internal delay value of the repeater;
determining a search window size based on the desired length of the physical link, the ratio value, the internal delay value and the first and second propagation delay values; and
installing the repeater within the communication system such that the physical link between the repeater and the base station corresponds to the desired length.

9. The method of claim 8, wherein determining the search window size comprises:
multiplying the desired length of the physical link by the ratio value to obtain a physical link delay value;
adding the second propagation delay value and the internal delay value with the physical link delay value to obtain a first sum value;
subtracting the first propagation delay value from the first sum value to obtain a second sum value; and
doubling the second sum value to determine the search window size.

10. The method of claim 8, wherein the physical link comprises a fiber optic cable.

11. Apparatus for communication system, wherein a remote station communicates to a base station through a repeater attached to the base station using a physical link, the apparatus comprising:
a summing unit configured to subtract a first propagation delay value and an internal delay value of the repeater from a second propagation delay value, and to add half of a desired search window size to obtain a sum value, wherein the first propagation delay value is a delay from the repeater to the remote station and the second propagation delay value is a delay from the base station to the remote station; and
a first dividing unit configured to divide the sum value by a ratio value of physical link delay value to physical link length.

12. The apparatus of claim 11, further comprising:
a second dividing unit coupled to the summing unit and configured to divide the desired search window size to obtain half of the desired search window size.

13. The apparatus of claim 11, wherein the physical link comprises a fiber optic cable.

14. Apparatus for communication system, wherein a remote station communicates to a base station through a repeater attached to the base station using a physical link, the apparatus comprising:
a first multiplying unit configured to multiply a desired length of the physical link by a ratio value of physical link delay value to physical link length to obtain a product value; and
a summing unit configured to add a first propagation delay value and an internal delay value of the repeater with the first product value, and to subtract a second propagation delay value to obtain a sum value, wherein the first propagation delay value is a delay from the repeater to the remote station and the second propagation delay value is a delay from the base station to the remote station.

15. The apparatus of claim 14, further comprising:
a second multiplying unit configured to double the sum value.

16. The apparatus of claim 14, wherein the physical link comprises a fiber optic cable.

17. Apparatus for communication system, wherein a remote station communicates to a base station through a repeater attached to the base station using a physical link, the apparatus comprising:
means for determining a desired search window size in time; means for determining a maximum physical link delay value based on the desired search window size;
means for determining a ratio value of physical link delay value to physical link length; and
means for determining a tolerable length of the physical link based on the maximum physical link delay value and the ratio value.

18. The apparatus of claim 17, wherein the means for determining a tolerable length of the physical link comprises:
means for determining a maximum length of the physical link.

19. The apparatus of claim 18, wherein the means for determining the maximum physical link delay value comprises:
means for determining a first propagation delay value from the base station to the remote station;
means for determining a second propagation delay value from the repeater to the remote station;
means for determining an internal delay value of the repeater; and
means for determining the maximum physical link delay value based on the desired search window size, the internal delay value and the first and second propagation delay values.

20. The apparatus of claim 19, wherein the means for determining the maximum length of the physical link comprises:
means for subtracting the second propagation delay value and the internal delay value from the first propagation delay value to obtain a first sum value;
means for adding half of the desired search window size with the first sum value to obtain a second sum value; and
means for dividing the second sum value by the ratio value to determine the maximum length of the physical link.

21. The apparatus of claim 17, wherein the physical link comprises a fiber optic cable.

22. Apparatus for communication system, wherein a remote station communicates to a base station through a repeater attached to the base station using a physical link, the apparatus comprising:
means for determining a desired length of the physical link;
means for determining a ratio value of physical link delay value to physical link length;
means for determining a first propagation delay value from the base station to the remote station;
means for determining a second propagation delay value from the repeater to the remote station;
means for determining an internal delay value of the repeater; and
means for determining a search window size based on the desired length of the physical link, the ratio value, the internal delay value and the first and second propagation delay values.

23. The apparatus of claim 22, wherein the means for determining the search window size comprises:
- means for multiplying the desired length of the physical link to the ratio value to obtain a physical link delay value;
- means for adding the second propagation delay value and the internal delay value with the physical link delay value to obtain a first sum value;
- means for subtracting the first propagation delay value from the first sum value to obtain a second sum value; and
- means for doubling the second sum value to determine the search window size.

24. The apparatus of claim 22, wherein the physical link comprises a fiber optic cable.

25. Machine readable medium storing machine readable codes for communication system, wherein a remote station communicates to a base station through a repeater attached to the base station using a physical link, the machine readable medium comprising:
- machine readable codes for determining a desired search window size in time;
- machine readable codes for determining a maximum physical link delay value based on the desired search window size;
- machine readable codes for determining a ratio value of physical link delay value to physical link length; and
- machine readable codes for determining a tolerable length of the physical link based on the maximum physical link delay value and the ratio value.

26. The machine readable medium of claim 25, wherein the machine readable codes for determining a tolerable length of the physical link comprises:
- machine readable codes for determining a maximum length of the physical link.

27. The machine readable medium of claim 26, wherein the machine readable codes for determining the maximum physical link delay value comprises:
- machine readable codes for determining a first propagation delay value from the base station to the remote station;
- machine readable codes for determining a second propagation delay value from the repeater to the remote station;
- machine readable codes for determining an internal delay value of the repeater; and
- machine readable codes for determining the maximum physical link delay value based on the desired search window size, the internal delay value and the first and second propagation delay values.

28. The machine readable medium of claim 27, wherein the machine readable codes for determining the maximum length of the physical link comprises:
- machine readable codes for subtracting the second propagation delay value and the internal delay value from the first propagation delay value to obtain a first sum value;
- machine readable codes for adding half of the desired search window size with the first sum value to obtain a second sum value; and
- machine readable codes for dividing the second sum value by the ratio value to determine the maximum length of the physical link.

29. A machine readable medium storing machine readable codes for communication system, wherein a remote station communicates to a base station through a repeater attached to the base station using a physical link, the machine readable medium comprising:
- machine readable codes for determining a desired length of the physical link;
- machine readable codes for determining a ratio value of physical link delay value to physical link length;
- machine readable codes for determining a first propagation delay value from the base station to the remote station;
- machine readable codes tor determining a second propagation delay value from the repeater to the remote station;
- machine readable codes for determining an internal delay value of the repeater; and machine readable codes for determining a search window size based on the desired length of the physical link, the ratio value, the internal delay value and the first and second propagation delay values.

30. The machine readable medium of claim 29, wherein the machine readable codes for determining the search window size comprises:
- machine readable codes for multiplying the desired length of the physical link to the ratio value to obtain a physical link delay value;
- machine readable codes for adding the second propagation delay value and the internal delay value with the physical link delay value to obtain a first sum value;
- machine readable codes for subtracting the first propagation delay value from the first sum value to obtain a second sum value; and
- machine readable codes for doubling the second sum value to determine the search window size.

31. A method for communication system, wherein a remote station communicates to a base station through a repeater attached to the base station using a physical link, the method comprising:
- determining a desired search window size in time;
- determining a tolerable physical link delay value based on the desired search window size;
- determining a ratio value of physical link delay value to physical link length;
- determining a length of the physical link;
- determining whether the length of the physical link is sufficient for the desired search window size, based on the tolerable physical link delay value and the ratio value; and
- installing the repeater within the communication system such that the physical link between the repeater and the base station corresponds a length determined to be sufficient for the desired search window size.

32. The method of claim 31, wherein determining the length of the physical link comprises:
- determining the length of the physical link while installing the physical link to attach the repeater to the base station; and
- wherein determining whether the Length of the physical link is sufficient comprises: determining whether the length of the physical link is sufficient while installing the physical link to attach the repeater to the base station.

33. The method of claim 31, wherein determining the tolerable physical link delay value comprises: determining a maximum physical link delay for the desired search window size.

34. The method of claim 33, wherein determining the maximum physical link delay value comprises:
- determining a first propagation delay value from the base station to the remote station;
- determining a second propagation delay value from the repeater to the remote station;
- determining an internal delay value of the repeater; and determining the maximum physical link delay value based on the desired search window size, the internal delay value and the first and second propagation delay values.

35. The method of claim 34, wherein determining whether the length of the physical link is sufficient comprises:

subtracting the second propagation delay value and the internal delay value from the first propagation delay value to obtain a first sum value;

adding half of the desired search window size with the first sum value to obtain a second sum value; and dividing the second sum value by the ratio value to determine whether the length of the physical link is sufficient.

36. The method of claim 31, wherein the physical link comprises a fiber optic cable.

37. Apparatus for communication system, wherein a remote station communicates to a base station through a repeater attached to the base station using a physical link, the apparatus comprising:

means for determining a desired search window size in time; means for determining a tolerable physical link delay value based on the desired search window size;

means for determining a ratio value of physical link delay value to physical link length;

means for determining a length of the physical link; and means for determining whether the length of the physical link is sufficient for the desired search window size, based on the tolerable physical link delay value and the ratio value.

38. The apparatus of claim 37, wherein the means for determining the length of the physical link comprises:

means for determining the length of the physical link while installing the physical link to attach the repeater to the base station; and wherein the means for determining whether the length of the physical link is sufficient comprises: means for determining whether the length of the physical link is sufficient while installing the physical link to attach the repeater to the base station.

39. The apparatus of claim 37, wherein the means for determining the tolerable physical link delay value comprises:

means for determining a maximum physical link delay tolerated for the desired search window size.

40. The apparatus of claim 39, wherein the means for determining the maximum physical link delay value comprises:

means for determining a first propagation delay value from the base station to the remote station;

means for determining a second propagation delay value from the repeater to the remote station;

means for determining an internal delay value of the repeater; and means for determining the maximum physical link delay value based on the desired search window size, the internal delay value and the first and second propagation delay values.

41. The apparatus of claim 40, wherein the means for determining whether the length of the physical link is sufficient comprises:

means for subtracting the second propagation delay value and the internal delay value from the first propagation delay value to obtain a first sum value;

means for adding half of the desired search window size with the first sum value to obtain a second sum value; and means for dividing the second sum value by the ratio value to determine whether the length of the physical link is sufficient.

42. Apparatus for communication system, wherein a remote station communicates to a base station through a repeater attached to the base station using a physical link, the method comprising:

a storage medium configured to store a first propagation delay value from the base station to the remote station, a second propagation delay value from the repeater to the remote station, an internal delay value of the repeater and a desired search window size; and a processor coupled to the storage medium and configured to determine whether a length of the physical link is sufficient for the desired search window size, based on the first and second propagation delay values, the internal delay value and the desired search window size.

43. The apparatus of claim 42, further comprising:

a measuring unit coupled to the processor and configured to determine the length of the physical link.

44. The apparatus of claim 42, further comprising:

output unit coupled to the processor and configured to output a signal to a user indicating that the length of the physical link is not sufficient for the desired window size.

45. The method of claim 42, wherein the physical link comprises a fiber optic cable.

* * * * *

UNITED STATES PATENT AND TRADEMARK OFFICE
CERTIFICATE OF CORRECTION

PATENT NO. : 7,593,360 B2  Page 1 of 1
APPLICATION NO. : 10/844666
DATED : September 22, 2009
INVENTOR(S) : Kenneth R. Baker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this

Twenty-first Day of September, 2010

David J. Kappos
*Director of the United States Patent and Trademark Office*